United States Patent

Kumura et al.

[15] 3,650,704
[45] Mar. 21, 1972

[54] NOVEL SYNTHETIC HYDROTALCITE AND ANTACID COMPRISING SAID SYNTHETIC HYDROTALCITE

[72] Inventors: Teruhiko Kumura, 305, Yashima-Nishimachi; Norio Imataki, 25-8, 2-chome Tukuokamachi, both of Takamatsu-shi; Katuyuki Hasui, 1692, Konzaki, Sangawacho; Takeo Inoue, 297, Otoi, Zoda, Nagao-cho; Kimiaki Yasutomi, 761, Zoda, Nagao-cho, all of Ohkawa-gun, Kagawa-ken, Japan

[22] Filed: Jan. 6, 1970
[21] Appl. No.: 925

Related U.S. Application Data

[63] Continuation-in-part of Ser. No. 654,977, July 21, 1967, Pat. No. 3,539,306.

[30] Foreign Application Priority Data

July 25, 1966 Japan......................41/48349

[52] U.S. Cl..............................23/315, 424/154
[51] Int. Cl................G01f 5/00, C01f 7/00, A61k 27/00
[58] Field of Search........................23/315; 424/127, 154

[56] References Cited

UNITED STATES PATENTS 2,958,626   11/1960   Schenck et al..........................23/315

Primary Examiner—Oscar R. Vertiz
Assistant Examiner—Hoke S. Miller
Attorney—Sherman and Shalloway

[57] ABSTRACT

A synthetic hydrotalcite having the composition expressed by the formula:

$$Al_2O_3 \cdot 6MgO \cdot CO_2 \cdot 12H_2O$$

and having substantially the following diffraction X-ray diffraction analysis:

d. Å 7.75, 3.89, 2.59, 2.30, 1.96, 1.53 and 1.50 said synthetic hydrotalcite containing heavy metal impurities in amounts of up to 30 p.p.m., being insoluble or substantially insoluble when treated with 1/10 N NaOH at 37° C. for one hour, having an acid consuming capacity of at least 240 ml/g, and being characterized by such properties that the time required for the artificial gastric juice to come to have a pH of higher than 3.0 is up to 30 seconds and time during which the pH of the artificial gastric juice is maintained above 3.0 is more than 120 minutes.

2 Claims, 6 Drawing Figures

NOVEL SYNTHETIC HYDROTALCITE AND ANTACID COMPRISING SAID SYNTHETIC HYDROTALCITE

The instant application is a continuation-in-part application of the application Ser. No. 654,977 filed on July 21, 1967, now U.S. Pat. No. 3,539,306.

This invention relates to a novel synthetic hydrotalicite having desired combined properties required of an antacid.

The ideal gastric antacid is required to meet the following conditions: that it should show the maximum neutralizing effect in the possible shortest time to such an extent that it raises the pH of gastric juice to around 3 within 1 minute after administration; it should neutralize an adequate amount of gastric hydrochloric acid by maintaining the pH of gastric juice to 3-5 during the normal period of gastric digestion; any excess, however, great, should not cause alkalization of gastric juice nor constipation, diarrhea or alkalosis to the pateint; and that its acid consuming capacity should not be impaired by pepsin nor affected by moisture or temperature.

Heretofore, the researches for such antacid meeting the above requirements have been centered on aluminum hydroxide. However, while aluminum hydroxide gel immediately after its preparation is amorphous under X-ray examination and highly reactive with acid, and furthermore its acid consuming capacity is little damaged by pepsin, with the lapse of time or when it is made into a dry product, its reactivity with acid falls and its acid consuming capacity tends to be more appreciably damaged by pepsin. Further, many of the products of this type crystallize. With the purpose of preventing or controlling such phenomena, it has been proposed to add to the aluminum hydroxide gel such matters as organic acid, amino acid, protein, saccharide and the like, or to co-precipitate with the aluminum oxide gel calcium carbonate, magnesium carbonate, silicic acid and the like. These methods however are objectionable in that since substances having no acid consuming capacity or those impairing the acid consuming capacity of the aluminum hydroxide gel are added, the products have a lowered acid consuming capacity per gram and become more expensive. Further, in most cases those methods fail to satisfactorily overcome the decrease in the reactivity of the aluminum hydroxide get with acid with the lapse of the time.

For these reasons, antacid having quick-appearing and sustaining effect as well as excellent storeability has been strongly demanded.

We have found that hydrotalcite which itself is a stable crystalline substance possesses desired combined properties of immediate effect, durable effect and storage stability, and that, therefore, the same can provide an excellent, ideal antacid.

Hydrotalcite is known as a mineral having a chemical structure of the formula $$Mg_6Al_2(OH)_{16}CO_3.4H_2O \text{ or } Al_2O_3.6M_gO.CO_2.12H_2O$$

which has been naturally produced in only very limited areas such as in Norway and Ural.

Not only is natural hydrotalcite produced in very small amounts in very limited areas, but also it has a fatal defect as antacid and excipient to be used in the medical field. More specifically, as W.F. Foshag; Proc. U.S. Natural Museum, 58, No. 2,329,148, for instance, describes, "The material is considerably intermished with spinel and other materials, so that a chemical analysis would lead to no definite results," the natural hydrotalcite is not present in a pure product and it always contains other mineral such as penninite [$Mg_5+xAl_2-2xSi_3+xO_{10}(OH)$] and muscovite [$KAl_2Si_3AlO_{10}(OH)_2$]. In addition, heavy metals which give bad influences to the human body and to which severe limitations are given in the medical field are contained in the natural hydrotalcite in amounts exceeding allowed-above limits. And, it is impossible to remove such impurities from the natural hydrotalcite.

Further, the natural hydrotalcite fails to possess properties required of an antacid, say, immediate effect and a property of neutralizing gastric juice by maintaining the pH of gastric juice to 3-5, and it does not have any property required of an excipient. Accordingly, the natural hydrotalcite has not been used as antacid or excipient.

A process for the synthesis of hydrotalcite has been proposed, which comprises adding dry ice or ammonium carbonate to a mixture of magnesium oxide and γ-alumina or a thermal decomposition product from a mixture of magnesium nitrate and aluminum nitrate, and thereafter maintaining the system at temperatures below 325° C. and under elevated pressures of total 2,000-20,000 p.s.i. (Roy et al.; American Journal of Science, 251, 350-353 (1953)). However, this process is obviously unpracticable for industrial scale production of hydrotalcite, because the reaction system must be maintained under considerably high pressures.

Although the prevention of incorporation of impurities harmful to the human body in the synthetic hydrotalcite may be possible in conducting the above process by selecting classes of the starting materials very carefully, it is impossible to work this process in an industrial scale for the reasons described above, and furthermore, in accordance with this precess, as disclosed, for instance, in American Journal of Science, 251, May, page 356, Table 6, substances other than hydrotalcite, such as brucite, boehmite, diaspore and hydromagnesite, are inevitably formed, with the result that it is impossible to recover pure synthetic hydrotalcite as single substance. Still further, the product prepared in accordance with the above process is highly crystalline because the preparation is performed under extremely high pressures. Therefore, the product fails to possess a most necessary property required of an antacid, i.e., immediate effect, still in addition, with the use of the product of, this process it is difficult to neutralize gastric hydrochloric acid and maintain the pH of gastric juice to 3-5, and the product has not any properties required of an excipient.

Accordingly, it is apparent that the synthetic hydrotalcite prepared in accordance with the above mentioned process cannot be used as either antacid or excipient.

We have succeeded in obtaining a novel synthetic hydrotalcite being free of impurities and having desired properties as antacid or excipient.

Accordingly, a primary object of this invention is to provide a novel synthetic hydrotalcite being substantially free of impurities and having an excellent acid consuming property, a desired combination of immediate effect and effect durability, and an excellent storage stability, and an antacid comprising said synthetic hydrotalcite.

Another object of the invention is to provide a novel excipient for pharmaceutical and other chemical industrial uses which contains said synthetic hydrotalcite and is excellent in such properties as compressibility as well as hardness and compression strength after the shaping.

Other objects and advantages of the invention will become apparent from the description which will be given hereinafter.

According to this invention there is provided a novel synthetic hydrotalcite having the composition expressed by the formula;

$$Al_2O_3.6MgO.CO_2.12H_2O$$

and having substantially the following X-ray diffraction analysis;

| d.Å |
|---|
| 7.75 |
| 3.89 |
| 2.59 |
| 2.30 |
| 1.96 |
| 1.53 |
| 1.50 | said synthetic hydrotalcite containing heavy metal impurities in amounts of up to 30 p.p.m., being insoluble or substantially insoluble when treated with 1/10 N NaOH at 37° C. for 1 hour, having an acid consuming capacity, expressed in terms of the amount (ml.) of 0.1 N hydrochloric acid required for neutralizing 1 gram of said hydrotalcite, of at least 240 ml./g., and being characterized by such properties that when 1 gram of said synthetic hydrotalcite is added to 150 ml. of artificial gastric juice of U. S. Pharmacopeia followed by agitation for 10 minutes and the artificial gastric juice is continuously added thereto at a rate of 2 ml./min., the time required for the artificial gastric juice to come to have a pH of higher than 3.0 is up to 30 seconds and the time during which the pH of the artificial gastric juice is maintained above 3.0 is more than 120 minutes, with the proviso that the maximum pH of the artificial gastric juice during said time is below 4.5.

The said novel hydrotalcite is synthesized by a process which comprises mixing an aluminum component with a magnesium component in an aqueous medium in the presence of carbonate ion at a pH of at least 8 and thereafter, recovering the resultant precipitate, the said aluminum component being selected from the group consisting of aluminum hydroxide, basic alminum carbonate, aluminum hydroxide-alkali carbonate complexes, aluminum amino acid salts, aluminum alcoholates, water-soluble aluminum salts, and water-soluble aluminates, and the said magnesium component being selected from the group consisting of magnesium oxide, magnesium hydroxide, magnesium carbonate and water-soluble magnesium salts. The aluminum component to be employed for the synthesis of the hydrotalcite of this invention may be any member of the group consisting of aluminum hydroxide, basic aluminum carbonate, aluminum hydroxide-alkali carbonate complexes, aluminum amino acid salts, aluminum alcoholates, water-soluble aluminum salts and water-soluble aluminates. As the aluminum bydroxide-alkali carbonate complex there may be used those prepared in accordance with the processes disclosed in the specifications of U.S. Pat. Nos. 2,783,124; 2,783,127 and 2,783,179. As the water-soluble aluminum salt, aluminum salts of acids such as aluminum sulphate, aluminum chloride, aluminum nitrate and aluminum acetate, and their complex salts such as alum can be used. As the water-soluble aluminate there may be used an alkali aluminate such as sodium aluminate. Obviously, in conducting the above process, it is permissible to form aluminum hydroxide, aluminum hydroxide-alkali carbonate complex, basic aluminum carbonate or aluminum amino acid salt in situ, preceding the described reaction.

As the magnesium component which is the other reactant, any member of the group consisting of magnesium oxide, magnesium hydroxide, magnesium carbonate and water-soluble magnesium salts may be used. As the water-soluble magnesium salt, there can be mentioned mineral acid salts of magnesium such as magnesium chloride, magnesium nitrate, magnesium sulphate, magnesium dicarbonate and bittern.

In accordance with the above process, the said aluminum component is mixed with the magnesium component in a basic aqueous medium in the presence of carbonate ion. To increase the yield of the hydrotalcite, it is preferably to mix the aluminum component with the magnesium component so that the atomic ratio of Al to Mg may be about one-third, and to cause the carbonate ion to be present in a ratio of at least one-ninth to each aluminum atom. Of course, it is most preferable to react the components in stoichiometric amounts.

In conducting the above process, a difficulty water-soluble aluminum component such as aluminum hydroxide, basic aluminum carbonate, aluminum amino acid salts and aluminum hydroxide-alkali carbonate complexes, or a difficulty water-soluble magnesium component such as magnesium oxide, magnesium hydroxide and magnesium carbonate can be added to the aqueous medium as they are, or as in the form of a liquid suspension. On the other hand, when a water-soluble aluminum salt and/or a water-soluble magnesium salt is used, it is preferred to add such salt to the aqueous medium in the form of an aqueous solution.

According to a preferred embodiment of the above process, the mixing is performed to make the pH of the entire system composed of the aluminum component, magnesium component, carbonate component and aqueous medium at least 8, particularly above 9.5. With the pH of the entire system below 8, the intended hydrotalcite is obtainable only at a low yield. In order to maintain the pH of the entire system at said level during the reaction, alkaline substances such as an alkali hydroxide and/or an alkali carbonate may be suitably added to the aqueous medium, when a water-soluble aluminum salt and/or a water-soluble magnesium salt is used.

The required presence of carbonate ion in the reaction system can be effected by addition of a carbonate to the system or by blowing carbon dioxide gas into the system. Obviously, such procedure may be omitted when an aluminum hydroxide-carbonate complex is used as the aluminum component or magnesium carbonate, as the magnesium component, since in those cases the reaction system will contain a sufficient amount of carbonate ion. When a water-soluble aluminum salt and/or a water-soluble magnesium salt is used, it is convenient to use a combination of an alkali carbonate and an alkali hydroxide as the carbonate, because the control of pH of the reaction system and the carbonate ion supply can be achieved by a single operation.

The critical feature of the above process resides in that the reaction of the aluminum component, magnesium component and carbonate ion is performed in water and under a basic condition. Because the reaction of the three is performed in water, it is made possible to supply carbon dioxide as the carbonate ion without any pressurization, and consequently mild reaction condition with respect to pressure and temperature become feasible.

The temperature conditions for the reaction vary considerably depending on the types of the aluminum component and magnesium component employed, but normally the range of 0° – 150°C. is preferred. Also the reaction time is to some extent a dependent factor on the reaction temperature and the types of the starting materials. For instance, if a difficulty water-soluble substance is used as at least one of the starting materials, it is preferable to effect heating to a temperature above 40°C. and above 50°C. to accelerate the reaction. The reaction time is shorter as a higher heating temperature is adopted, but if starting materials having a good reactivity are chosen, hydrotalcite is formed with 10 minutes even if the temperature is around 50°C. When water-soluble materials alone are used, the reaction takes place instantaneously at a temperature ranging from 0° to 150°C.

As in accordance with the above process the hydrotalcite is obtained in the form of precipitate, the product is filtered and washed with water if desired, and thereafter the solid is separated by known solid-liquid separation means such as centrifuge, followed by drying to serve as the dry product.

In a preferred embodiment of the above process, a water-soluble aluminum salt and a water-soluble magnesium salt are mixed to form a homogeneous aqueous solution, and the system is added with an alkali hydroxide and carbonate ion by means of addition of an alkali carbonate and/or alkali bicarbonate solution. Thereafter, the system is mixed, and the resultant precipitate is filtered, washed with water and dried to provide the desired product.

In accordance with the above embodiment, because the reaction progresses in a homogeneous system, the reaction condition can be controlled with ease, and furthermore there is another advantage in that the entire procedure can be practiced continuously by supplying continuously from one end the aluminum component, magnesium component and carbonate component and concurrently withdrawing from the other end a slurry of the resultant hydrotalcite.

In another embodiment of the above process in which aluminum hydroxide is used as the aluminum component, an aqueous slurry of aluminum hydroxide is added with neutral magnesium carbonate, and the system is heated at such temperature for such time as sufficient to cause disappearance of the magnesium carbonate crystals which can be confirmed by microscopic observation of the sample taken from the reaction mixture. Thus, the desired hydrotalcite is formed. When neutral carbonate is replaced by basic magnesium carbonate in the above embodiment, the heating to slightly elevated temperatures is sufficient, and without further positive heating during the reaction the intended hydrotalcite can be obtained by considerably prolonged drying of the product. In the foregoing two embodiments, the formed product does not contain soluble impurities and therefore need not be washed with water.

In accordance with still another embodiment of the above process, hydrotalcite is formed by either addition of an alkali carbonate (including an alkali bicarbonate) or blowing-in of carbon dioxide gas, to a slurry of aluminum hydroxide and magnesium oxide or magnesium hydroxide. In this case, the mol ratio of the alkali carbonate to aluminum hydroxide should preferably be not less than 1. If the concentration of the suspension is smaller, it is necessary to make the mol ratio of the alkali carbonate greater. The preferred reaction temperature is above 45°C., it being the case that the higher is the reaction temperature, the better it is for formation of hydrotalcite. The use of an alkali bicarbonate given better results for formation of hydrotalcite than the use of neutral alkali carbonate. Basic aluminum carbonate can similarly be used in place of the said aluminum hydroxide.

In still another embodiment of the above process, an aluminum hydroxide-alkali carbonate complex or aluminum amino acid salt, and magnesium oxide or hydroxide are mixed together as an aqueous slurry. Because aluminum hydroxide-alkali carbonate complexes and aluminum amino acid salts are highly stable as compared with aluminum hydroxide, the use of such complex or salt is advantageous in that the selection of reaction conditions become easier. For instance, when carbon dioxide is passed through a suspension containing aluminum hydroxide and magnesium oxide or hydroxide, it is preferred to cause the absorption of carbon dioxide gas at low temperatures, followed by heating the system to 70°C. or above, in consideration of the fact that a part of aluminum hydroxide loses reactivity upon heating. When the carbon dioxide gas above 50°C. is blown in, such case is desirable as to employ aluminum hydroxide of a high stability against elevated temperatures or to shorten the duration of the high temperature treatment. In contrast, when an aluminum hydroxide-alkali carbonate complex or aluminum amino acid salt is used, the reaction is performed with ease by passing carbon dioxide gas through a suspension containing the complex or amino acid salt and magnesium hydroxide or magnesium oxide with heating to a temperature ranging from 50°C. to the boiling point of the reaction system.

Even when the presence of carbonate ion is effected by blowing in carbon dioxide gas, it is unnecessary to elevate the pressure of the reaction system at all. Namely, hydrotalcite can be synthesized by conducting the reaction under atmospheric pressure without any particular pressurization.

Besides the above described embodiments, it should be obvious to one skilled in the art, as either of the aluminum and magnesium components, an aqueous solution of a water-soluble salt may be used. In any of the embodiments, however, it is essential that the reaction among the aluminum component, magnesium component and carbonate ion should be performed in water at a pH of the basic side.

The synthetic hydrotalcite of the invention prepared in accordance with the above process has a structure represented by the general formula $$Al_2O_3 \cdot 6MgO \cdot CO_2 \cdot 12H_2O$$

and is characterized in that it is substantially free of impurities.

For better illustration of the invention, the drawings are appended to the present specification.

Figure 4:
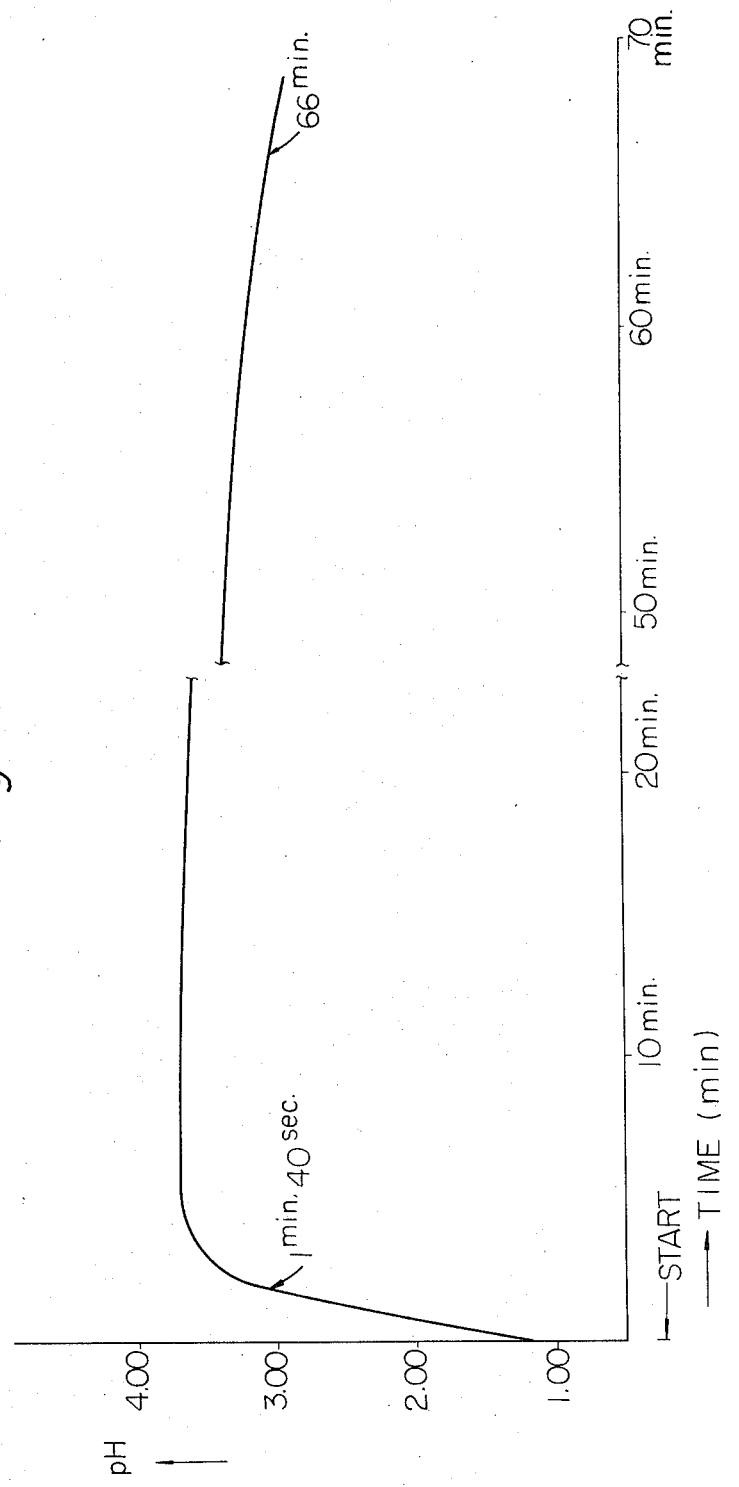

FIG. 4 is a curve illustrating the relation between the hydrogen ion concentration and the lapse of time, when a known antacid taught by U.S. Pat. No. 2,958,626 to Schenck et al. is added to artificial gastric juice in accordance with the same method.

Figure 5:
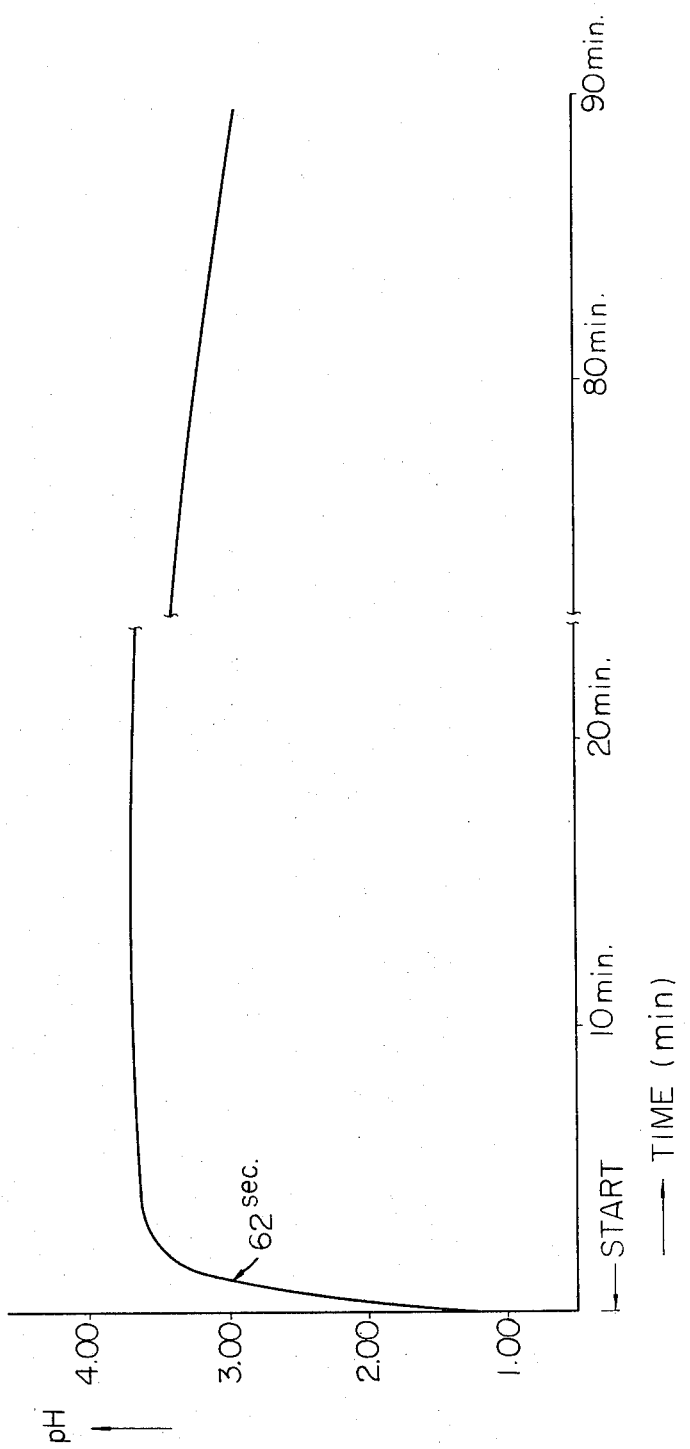
Figure 6:
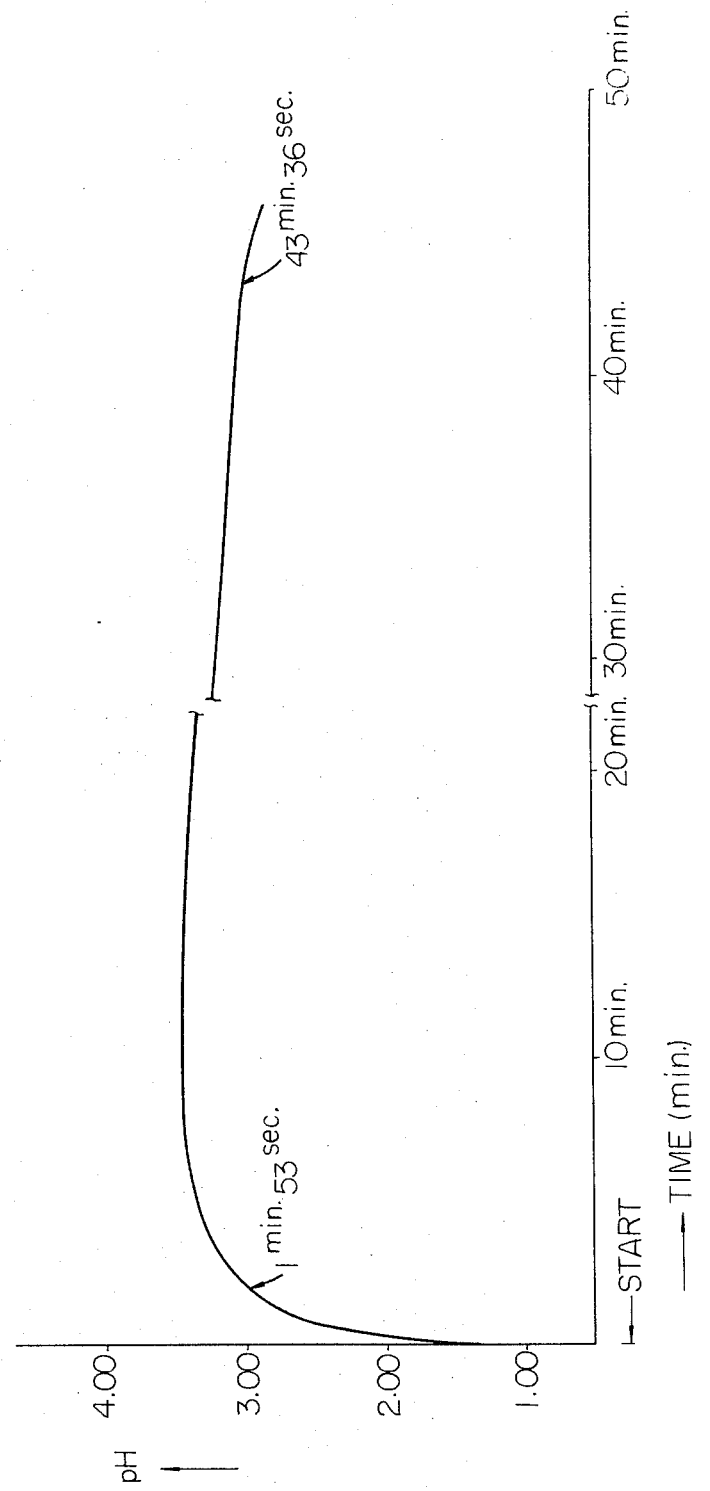

FIGS. 5 and 6 are curves each illustrating the relation between the hydrogen ion concentration and the lapse of time, when the above known antacid is added to artificial gastric juice after it has been subjected to the stability test detailed hereinafter.

The characteristic values of the synthetic hydrotalcite of the invention and of known hydrotalcites (ASTM Card No. 14-191 and Roy et al.) and natural hydrotalcite produced in Norway, as obtained from the results of X-ray diffraction analysis using Cu-Kα rays are given in Table 1 below in which $d$ means the spacing of the crystal.

TABLE 1

| Hydrotalcite according to ASTM card | Natural hydrotalcite produced in Snarum, Norway* | Hydrotalcite of the invention** | Product of the method of D. Ray et al.*** |
|---|---|---|---|
| 7.69 | 7.77 | 7.82 | 7.79 |
|  | 14.5p |  |  |
|  | 10.1 m |  | 6.11**** |
|  | 7.19 p |  |  |
| 3.88 | 3.89 | 3.90 | 3.89 |
|  | 5.06 m |  | 3.16**** |
|  |  |  | 2.74***** |
| 2.58 | 2.59 | 2.58 | 2.58 |
|  | 4.90 p |  | 2.50***** |
|  |  |  | 2.35**** |
| 2.30 | 2.30 | 2.33 | 2.31 |
|  | 3.59 p |  | 2.10***** |
|  | 3.37 m |  |  |
| 1.96 | 1.96 | 1.97 | 1.96 |
|  |  |  | 1.86**** |
|  | 2.86 p |  |  |
| 1.85 | 1.85 | 1.75 | 1.75 |
|  | 2.61 p |  | 1.70***** |
|  | 2.51 p |  |  |
| 1.75 | 1.76 | 1.66 | 1.65 |
| 1.65 | 1.65 |  |  |
|  | 2.36 p |  |  |
|  | 2.01 p |  |  |
| 1.53 | 1.53 | 1.53 | 1.53 |
|  | 1.57 |  |  |
| 1.50 | 1.50 | 1.50 | 1.50 |
| 1.28 | 1.20 |  |  |

*p*: diffractions due to penninite

*m*: diffractions due to muscovite

\* In the repraration of the sample, a white portion of the natural hydrotalcite ore was chosen as much as possible and ground in a bawl mill to particles of less than 10 microns.

\*\* The sample was prepared in accordance with the method described in Example 5 of the specification of the instant application.

\*\*\* The sample was obtained by conducting the hydrothernal reaction at 175° C. under a total pressure of 140 atmospheres. As the starting materials there were used a mixture of aluminum and magnesium nitrate treated at 500° C. and ammonium carbonate.

\*\*\*\* diffractions due to beohmite.

\*\*\*\*\* diffractions due to magnesium carbonate.

Figure 1:
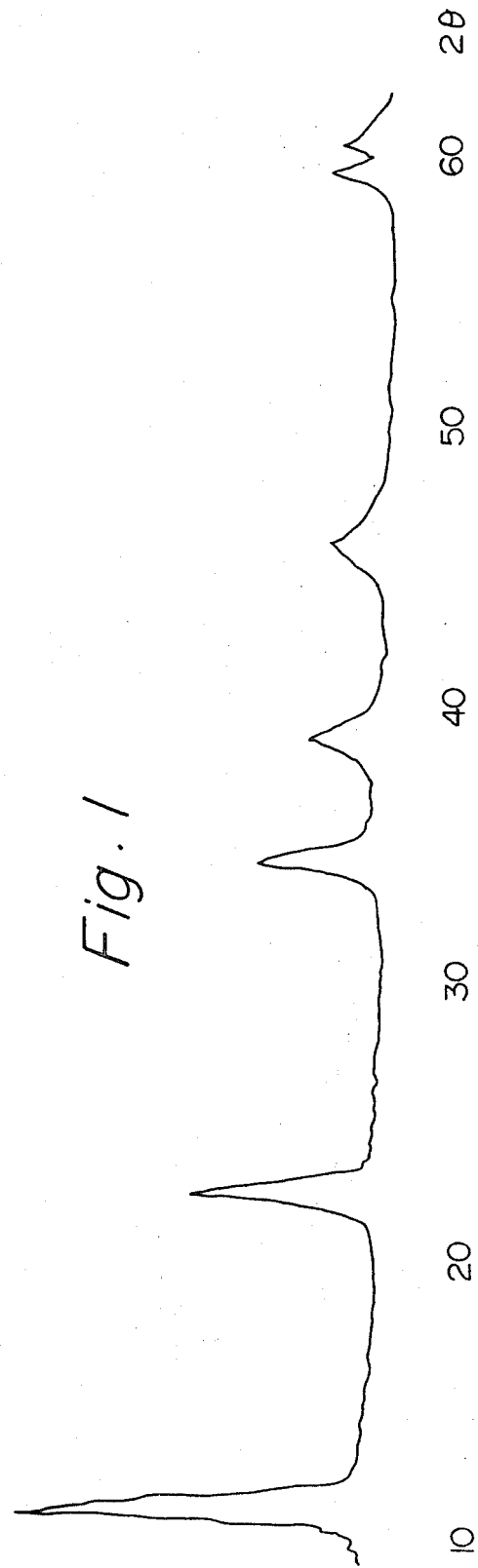
FIG. 1 is a view illustrating the X-ray diffraction pattern of the synthetic hydrotalcite of the invention.
Figure 2:
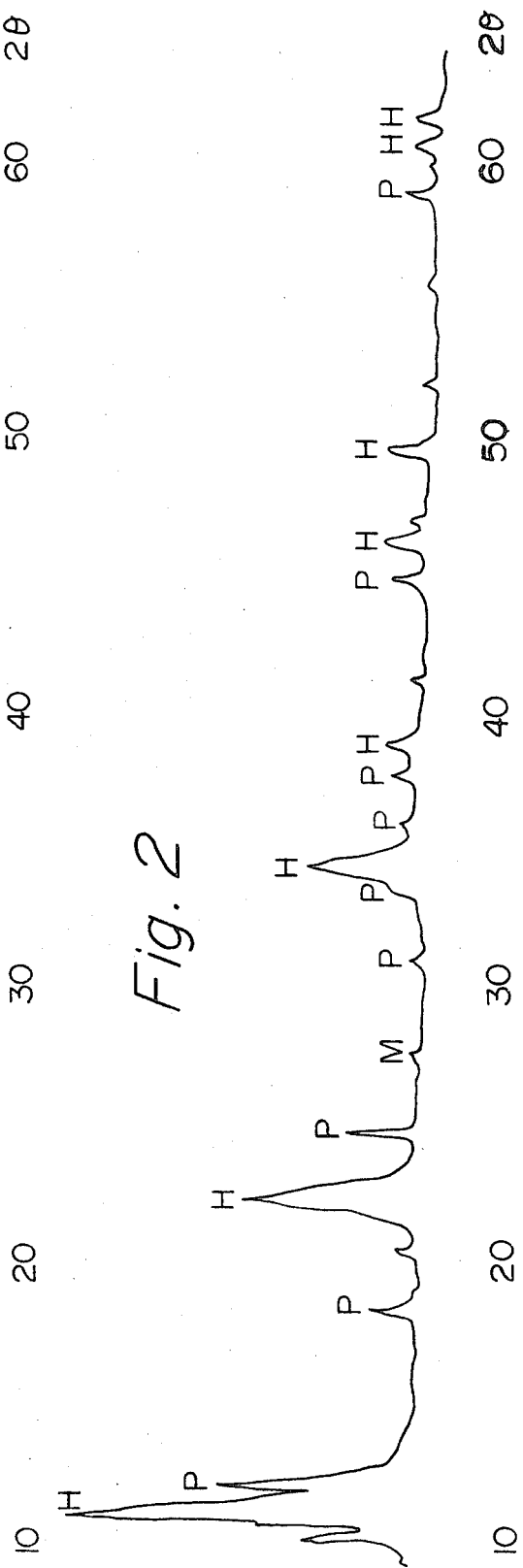
FIG. 2 is a view illustrating the X-ray diffraction pattern of natural hydrotalcite.

As is apparent from the results shown in Table 1 and from FIG. 1, the diffraction pattern of the synthetic hydrotalcite of the invention is in accord with that of the hydrotalcite described in ASTM card. On the other hand, in the sample of the natural hydrotalcite, even though prepared with great cares, impurities are contained as is apparent from Table 1 and FIG. 2, and the product according to the teachings of D. Roy et al. contains impurities as well as hydrotalcite. It is evident that the product of the method of D. Roy et al. is a mixture of substances prepared under various conditions. Further, the product of D. Roy et al. contains an alkali-soluble portion, namely, boemite. On the other hand, the synthetic hydrotalcite of the invention does not substantially contain any alkaliisoluble component.

The chemical analysis values of the synthetic hydrotalcite of the invention and natural hydrotalcite are shown in Table 2 below.

TABLE 2

|  | Natural hydrotalcite* | Invention product |
|---|---|---|
| MgO | 38.0% | 37.0% |
| Al₂O₃ | 16.6% | 15.6% |
| Fe | 0.60% | 0.0% |
| CaO | None | None |
| CO | 6.7% | 7.7% |
| Ignition loss | 41.5% | 46.7% |
| Water (105° C.×3hrs.) | 0.48% | 6.1% |
| As₂O₃ | 1 p.p.m. | 0.5 p.p.m. |
| Heavy metal | 110 p.p.m. | 4 p.p.m. |
| Acid consuming property | 242 | 277 |
| Acid-insoluble matters | 2.83% | None |

* The hydrotalcite ore rich in white portions produced in Snarum, Norway was ground and screened through a sieve of 145 meshes.

The part capable of passing through said sieve was used as the sample. The said part corresponded to about 60 percent of the starting ore. In the remaining 40 percent part, there were contained considerable amounts of colored substances.

The contents of As₂O₃ and heavy metals and the values of acid consuming property were measured in accordance with the U.S. Pharmacopeia. Other values were obtained in accordance with the ordinary chemical analysis.

As is apparent from the data shown in Table 2, the natural hydrotalcite contains impurities, particularly heavy metals harmful to the human body in amounts exceeding allowable limits. Thus, it is evident that such hydrotalcite cannot be used as an excipient or a medicine. Examples of allowable limits of heavy metal contents according to U.S. Pharmacopeia are as follows:

| MgO | 40 p.p.m. |
| Aluminum gel | 5 p.p.m. |
| Magnesium trisilicate | 30 p.p.m. |
| NaHCO₃ | 5 p.p.m. |
| Magnesia milk | 5 p.p.m. |

In accordance with the fluoresent X-ray analysis of the natural hydrotalcite, the existence of elements, Pb, Ga, Cu, Zn, Ni and Fe, was observed.

In spite of its high magnesium content, the hydrotalcite of the invention gives a pH of 9.0–8.4 when 1 g. thereof is suspended in 50 ml. of water, and that of 5–6 when 2 g. thereof is thrown into 100 ml. of 1/10N hydrochloric acid. And, when 1 g. thereof is thrown into 150 ml. of an artificial gastric juice (0.068 N hydrochloric acid) and stirred for 10 minutes, and thereafter the artificial gastic juice is added to the system continuously at the rate of 2 ml./min., the pH of the system reaches 3.0 within 10–30 seconds. The maximum pH is about 4.1, and the duration of pH above 3.0 is about 2.5 hours. These data substantiate appropriately that the product of the invention is an antacid. Again the above effects were not changed when pepsin was added to the artificial gastric juice, or the hydrotalcite was heated for 3 hours in boiling water. The results of testing the acid consuming capacity and reactivity of the hydrotalcite of the invention and of know antacids in the artificial gastric juice in accordance with the above method are given in Table 3 below.

TABLE 3

| Antacid | Acid consuming capacity | *1) (sec.) | Maximum pH | *2) (min.) |
|---|---|---|---|---|
| Hydrotalcite of the invention | 278 | 12 | 4.15 | 139 |
| Hydrotalcite of the invention (boiled for 1 hour) | 278 | 13 | 4.10 | 138 |
| Natural hydrotalcite | 242 | 1,415 | | |
| Aluminum hydroxide dried gel | 296 | 300 | 3.8 | 119 |
| Calcium carbonate | 195 | 9 | 5.8 | 78 |
| Magnesium carbonate | 207 | 10 | 7.6 | 87 |
| Sodium bicarbonate | 119 | 3 | 6.2 | 23 |
| Dihydroxyaluminum aminoacetate | 175 | 60 | 3.8 | 53 |
| Magnesium carbonate aluminum hydroxide codried gel | 286 | 36 | 3.8 | 120 |
| Magnesium carbonate aluminum hydroxide codried gel (boiled for 1 hour) | 210 | 1,530 | — | — |
| Magnesium trisilicate | 104 | 480 | 3.7 | 12 |
| Product of D. Roy et al. | 264 | 630 | — | — |
| Product of Schenck et al | 247 | 62 | 3.7 | 89 |

* 1. Time required for gastric juice to reach a pH of 3.0.
* 2. Time required for the gastric juice to reach a pH below 3.0.

As is apparent from the data given above, the product of the invention has excellent properties required of an antacid while the natural hydrotalcite does not possess such properties.

In the synthetic hydrotalcite prepared under extremely elevated pressures as in the method of D. Roy et al., the crystallization is highly promoted and impurities are copresent; therefore, properties as an antacid of such product are extremely inferior to those of the product of the invention.

The specification of U.S. Pat. No. 2,958,626 to Schenck et al. discloses a process for the synthesis of an antacid having the composition expressed by the formula $(OH)_4Al_2Mg(CO_3)_2 \cdot nH_2O$. In this process, the synthesis reaction should be carried out under elevated pressures and the existence of $CO_2$ gas is indispensable. Such requirements are not necessary for the synthesis of the product of this invention. Further, the composition of the product of the invention expressed by the formula $Al_2O_3 \cdot 6MgO \cdot CO_2 \cdot 12H_2O$ is quite different from that of the antacid disclosed in the Schenck et al. reference. Still further, the synthetic hydrotalcite of this invention is far more excellent as an antacid than the product of the Schenck et al. reference with respect to storage stability, immediate effect and effect durability. Accordingly, it is evident that the product of this invention has been derived from a technical concept quite different from that of the invention of the Schenck et al. reference.

The results of comparative experiments of the products of this invention and of the Schenck et al. reference will be now detailed.

I. Experimental Procedures i. Preparation of Samples:

The sample of synthetic hydrotalcite of the invention was prepared in accordance with the method described in Example 3 of the present specification, and the preparation of the sample of basic aluminum magnesium carbonate of the Schenck et al. reference was conducted in accordance with the method described in Example 1 of said reference. The compositions (percent by weight) of both samples were measured by chemical analysis.

ii. Measurement of Acid Consuming Capacity:

Each sample was neutralized with 0.1 N hydrochloric acid, and the value of "acid consuming capacity" of the sample was expressed by number of ml. of 0.1 N hydrochloric acid required to neutralize 1 g. of the sample.

iii. Fuchs' Modification Test Method:

Although the Holbert et al. test method was adopted for appreciating the antaciding activity in the Schenck et al. reference, Fuchs' modification test method, which is a highly improved test method over the Holbert et al. method, was adopted in these experiments.

Fuchs' modification test method is a method for measuring the antaciding activity of an antacid in vitro employing a model stomach.

The following two artificial gastric juices were used in tests.

| * Artificial gastric juice A: | |
|---|---|
| itd Table salt (high quality) | 2.0 g. |
| Diluted hydrochloric acid | 24.0 ml. |
| Distilled water | balance |
| Total | 1,000 ml. (0.068 N) |
| * Artificial gastric juice B: | |
| Table salt (high quality) | 2.0 g. |
| Concentrated pepsin (1:5,000) (Product of Mikuni Chemical Co.) | 2.1 g. |
| Diluted hydrochloric acid | 24.0 ml. |
| Distilled water | balance |
| Total | 1,000 ml. (0.068 N) |

The test operation was in the following manner:

150 ml. of artificial gastric juice was charged in a 500-ml. volume beaker which was then fixed on a magnetic stirrer and dipped into a thermostat maintained at 37.5° C. Electrodes of a pH meter, and a thermometer were inserted into the beaker. Then the content of the beaker was stirred by means of the magnetic stirrer. When the temperature of the content of the beaker reached 37.5° C. one gram of the sample was added thereto and simultaneously a chart-recorder was operated. After 10 minutes had passed, a constant-volume pump was actuated and the addition of the gastric juice at a rate of 2 ml./min. was commended.

The values of the following antaciding characteristics were measured from the recorded chart:

| Rapidity: | Time required for the gastric juice to reach a pH of 3.0. |
|---|---|
| Maximum pH: | maximum pH value observed in the measurement. |
| Duration: | time required for the gastric juice to a pH below 3.0. |
| Reactivity with acid: | the ratio of the amount consumed of gastric juice actually measured to the amount consumed of gastric juice calculated from the value of acid consuming capacity. | iv. Stability Test:

Each sample was allowed to stand at a temperature of 70° C. and a relative humidity of 75 percent for 2 days. Then, the sample was subjected to Fuchs' modification test. The values of the above mentioned antaciding characteristics of the sample after and before the above stability test were compared.

II. Experimental Results

1. Chemical analysis values and values of acid consuming capacity of basic aluminum magnesium carbonate of the Schenck et al. reference and synthetic hydrotalcite of the invention are shown in Table 4 below.

TABLE 4

|  | Basic aluminum magnesium carbonate of Schenck et al. | Synthetic hydrotalcite of the invention |
|---|---|---|
| Chemical analysis values | | |
| $Al_2O_3$ | 31.8 % | 16.0 % |
| MgO | 12.6 % | 38.0 % |
| $CO_2$ | 27.0 % | 7.0 % |
| $H_2O$ | 25.1 % | 34.0 % |
| Acid consuming capacity | 247 ml. | 283 ml. |

2. Results of Fuchs' modification test.

Figure 3:
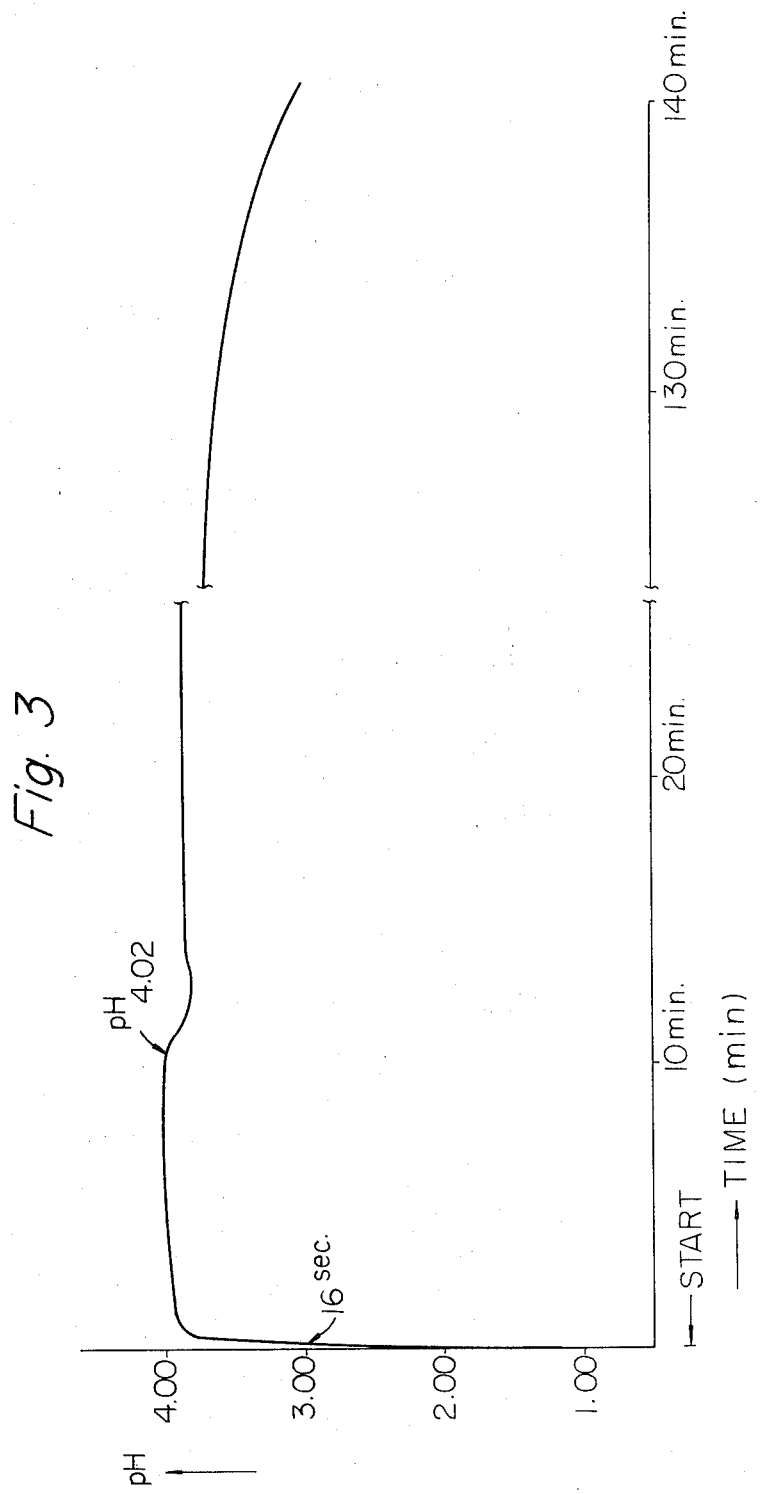
FIG. 3 is a curve illustrating the relation between the hydrogen ion concentration and the lapse of time, when the synthetic hydrotalcite of the invention is added to artificial gastric juice in accordance with the method detailed hereinafter.

The chart showing the relation between the lapse of time and the change in pH, which was obtained when synthetic hydrotalcite of the invention was subjected to Fuchs' modification test employing gastric juice A, is appended as FIG. 3.

The chart showing the relation between the lapse of time and the change in pH, which was obtained when basic aluminum magnesium carbonate of Schenck et al. was subjected to Fuchs' modification test employing gastric juice A, is appended as FIG. 4.

Table 5 below shows the values of the above-mentioned antaciding characteristics obtained from these charts.

TABLE 5

|  | Basic aluminum magnesium carbonate of Schenck et al. | Synthetic hydrotalcite of the invention |
|---|---|---|
| Rapidity | 1 minute and 2 seconds | 15 seconds |
| Maximum pH | 3.7 | 4.0 |
| Duration | 89 minutes | 143 minutes |
| Reactivity with acid | 76.8 % | more than 99 % |
| Sodium content | | 0.005 % |

3. Stability Test Results.

After synthetic hydrotalcite of the invention had been subjected to above mentioned high temperature and high humidity conditions, the actaciding properties thereof were tested in artificial gastric juices A and B, respectively. The resulting charts were almost the same as FIG. 3.

After basic aluminum magnesium carbonate of Schenck et al. had been subjected under the same high temperature and high humidity conditions, the antaciding properties were tested in artificial gastric juice A and B, respectively. The resulting charts are appended as FIGS. 5 and 6.

The values of the above-mentioned antaciding characteristics obtained from these chart are shown in Tables 6 and 7 below.

TABLE 6

(Fuchs' modification test with artificial gastric juice A after high temperature and high humidity treatment)

|  | Basic aluminum magnesium carbonate of Schenck et al. | Synthetic hydrotalcite of the invention |
|---|---|---|
| Rapidity | 1 minute and 40 seconds | 15 seconds |
| Maximum pH | 3.7 | 4.0 |
| Duration | 66 minutes | 143 minutes |
| Reactivity with acid | 57.0 % | more than 99 % |

TABLE 7

(Fuchs' modification test with artificial gastric juice B after high temperature and high humidity treatment)

|  | Basic aluminum | Synthetic |
|---|---|---|

|  | magnesium carbonate of Schenck et al. | hydrotalcite of the invention |
| --- | --- | --- |
| Rapidity | 1 minute and 53 seconds | 12 seconds |
| Maximum pH | 3.5 | 4.0 |
| Duration | 44 minutes | 143 minutes |
| Reactivity with acid | 38.0 % | more than 99 % |

The following matters are seen from the above experimental results.

1. The chemical composition of synthetic hydrotalcite of the invention is quite different from that of basic aluminum magnesium carbonate disclosed in the Schenck et al. reference.
2. Synthetic hydrotalcite of the invention is excellent over basic aluminum magnesium carbonate of Schenck et al. in rapid activity, because the value of rapidity hereinabove defined of the product of the invention is only 15 seconds while that of the product of Schenck et al. is 1 minute and 2 seconds. Synthetic hydrotalcite of this invention is excellent over basic aluminum magnesium carbonate of Schenck et al. in durability of activity, because the value of duration hereinabove defined of the product of the instant application is 143 minutes while that of the product of Schenck et al. is only 89 minutes. Further, synthetic hydrotalcite of the invention is excellent over basic aluminum magnesium of Schenck et al. in reactivity with acid, i.e., base component utilization ratio, because the value of reactivity with acid hereinabove defined of the product of the invention is more than 99 percent while that of the product of Schenck et al. is only 76.8 percent.

In short, the antacid of the invention is excellent in all of rapid activity, durability of activity and base component utilization ratio as compared with the antacid of the Schenck et al. reference.

3. When the antacid of Schenck et al. is subjected to high temperature and high humidity conditions (such as adopted usually in stability tests of antacids), there is observed a prominent degradation in each of the antaciding characteristics, rapid activity, durability of activity and reactivity with acid.

In contrast to the antacid of Schenck et al., the antacid of the invention does not show any degradation in any of said antaciding characteristics even when it is subjected to the same high temperature and high humidity conditions.

In short, the antacid of this invention is excellent over the antacid of Schenck et al. also in stability.

In case the product of this invention is used as an antacid, when a dosage of 0.5–1 g. is administered three or four times per day, excellent effects can be attained. Further, a combined use of the product of the invention with medicines for stomach such as autonomic nerve blocking agents and sugar sulfuric acid esters is expected to exhibit excellent curing effects to stomach diseases.

The results of biological and clinical experiments of the synthetic hydrotalcite of this invention will be now detailed.

1. Experimental date concerning toxicity of the synthetic hydrotalcite of the invention a. Acute toxicity Ten male mice of the D.D. type having a body weight of around 20 grams were adopted as one test group. The administration was conducted orally, peritoneally and hypodermically. Since the hydrotalcite of the invention is water-insoluble, it was incorporated in 1 percent tragacanth liquor in amounts of 5 percent, 10 percent and 20 percent, respectively, and suspended therein homogeneously by means of a stirrer. Thus, the hydrotalcite in the form of a homogeneous dispersion was administered. The observation was continued for seven days from the administration. In the groups to which the hydrotalcite was administered orally or hypodermically, no mouse died. In the case of the oral and hypodermic administration, the fatal dose ($LD_{50}$) due to the acute toxicity was more than 10,000 mg./kg. In the case of the peritoneal administration, the $LD_{50}$ value was 8,200 mg./kg. (value of seven days according to Behrens Kaerber method). Accordingly, the acute toxicity of the hydrotalcite of the invention does not appear or hardly appears in the case of mice.

b. Subchronic toxicity

Male rats of the Wistar type having a body weight of around 50 grams were bred in a thermostat breeding box of the Koyama type. They were divided into groups, each of which consisted of 10 rats. The hydrotalcite of the invention was incorporated in 1 percent tragacanth liquor in amounts of 5 percent, 10 percent and 20 percent, respectively, and suspended therein homogeneously by a stirrer.

Supposed that a dose of 0.6–1.0 g. is given four times per day to an adult, then the standard amount of the hydrotalcite administered to an adult is 2.4–4.0 g./day. From this standard amount to an adult, the standard amount to a rat was calculated to be 100 mg./kg./day.

The experiments were conducted on the following four groups:
  i. Group I: No administration (control group)
  ii. Group II: 500 mg./kg./day (five times of the standard amount)
  iii. Group III: 1,000 mg./kg./day (10 times of the standard amount)
  iv. Group IV: 2,000 mg./kg./day (20 times of the standard amount)

The enforce oral administration was conducted once a day at the prescribed time by means of an oral sound, and the administration was continued for 90 days and 180 days, respectively. The measuring of the weight was conducted every day at the prescribed time, and other conditions in rats such as movements, appetites, hair conditions, nose bleedings and changes in eyes were also examined. After the administration had been continued for 90 or 180 days, the rats were killed by bleeding, and examination of the blood and the measurements of the volumes and weights of the internal organs were conducted. Also the pathological and histological examination was carried out.

There was not observed any significant difference between the control group and any of other groups with respect to the body weight curve. In each group the growth was not inhibited by the administration of the hydrotalcite, and the rats grew normally. No significant difference was observed between the control group and any of other groups with respect to either the blood examination or the measurements of the volumes and weights of the internal organs. Further, there was observed no significant different with respect to the pathological and histological examination, either.

2. Experimental data concerning dissociation of the synthetic hydrotalcite of the invention in digestive canals When the hydrochloric acid-treated product of the hydrotalcite was examined by the X-ray diffraction, there was confirmed the existence of only known substances derived from medicines described in the Japanese pharmacopeia. Namely aluminum chloride and magnesium chloride alone were confirmed.

3. Date concerning the pharmacological actions and effects of the synthetic hydrotalcite of the invention The preventive and curative effects of the hydrotalcite of the invention on an experimental peptic uncer were examined. In the preventive effect tests, rats of the Shay type were employed, and the presence of ulcer and the frequency of accurrence of ulcer were examined after the administration of the hydrotalcite. Also the examination of gastric juice was conducted in the same rats. These results were inclusively appreciated. In the curative test, a so-called clamping method was adopted, and the measurement of the body weight, the examination of general conditions and the pathological and histological examination of ulcer were conducted. Thus, the curative effect to an experimental ulcer was appreciated.

In the prevention effect tests of the hydrotalcite of the invention on the experimental peptic ulcer in rats of the Shay type, it was confirmed that the formation of the ulcer was prevented, the secondary secretion of gastric juice was not promoted and that the buffer action of the pH of gastric juice was maintained within the range of the pH of 3 to 4.5. With respect to the acidity of gastric juice and the pepsin activity, there was observed preventive effects almost in proportion to the pH. Further, in the curative effect tests of the rat ulcer formed by the Clamping method, the hydrotalcite of the invention exhibited a tendency of promoting the curing of the ulcer.

Table 8 below shows the data of pharmacological properties in vitro and in vivo of the hydrotalcite of the invention and its related substances such as Sanarmin (2.5 MgO.AlD$_3$.XH$_2$O) glycinal [H$_2$NCH$_2$COOAl(OH)$_2$], sodium bicarbonate, synthetic aluminum silicate, dried aluminum hydroxide gel and dawsonite-like substance [Al(OH)$_3$.NaHCO$_3$]. From

| Institute | Administration method | | Administration period |
|---|---|---|---|
| Tokyo University | Single administration | 3.9 per day (3 times) | 7–84 days |
| Keio University | Single administration & combined administration | 3 g. per day (3 or 4 times) | 35 days in average |
| Nihon University | Single administration | 3 g. per day (3 times) | 21–105 days |
| Jikei Medical College | Combined administration | 1–3 g. per day | 4–35 days |
| Nihon Medical College | Combined administration | 3–4 g. per day (3 or 4 times) | 10–170 days | with respect to the cases treated in Jikei Medical College and Nihon Medical College, the following data based on ages of patients are given.

TABLE 8

| Properties | Solubility | Acid consuming property | Acid neutralizing properties | | | Antipeptic activity | Absorbing property | Effect of prohibiting or controlling occurence of ulcer | pH of gastric juice 20 hours after the oral administration | Secondary secretion of gastric juice | Formation of gas |
|---|---|---|---|---|---|---|---|---|---|---|---|
| | | | Manifestation of activity | Maximum- pH | Duration of activity | | | | | | |
| Substances: | | | | | | | | | | | |
| Synthetic hydrotalcite of the invention | None | Strong | Quick | 4.10 | Long | Observed | Low | Prohibiting | 3.7–4.5 | None | None. |
| Sanalmin (2.5MgO.Al$_2$O$_3$.XH$_2$O) | do | do | do | 4.93 | do | do | Low | Slightly controlling | 3.7–4.5 | do | Do. |
| Clycinal H$_2$NCH$_2$COOAl(OH)$_2$ | do | do | do | 3.96 | Slightly short | do | None | Prohibiting | 4.4–4.8 | do | Do. |
| Sodium bicarbonate (NaHCO$_3$) | Soluble | Slightly weak | do | 6.12 | Short | Deactivated | do | Slightly controlling | 2.9–3.0 | Observed | Observed. |
| Synthetic aluminum silicate | None | Weak | (*) | 2.85 | (*) | None | High | Prohibiting | 2.3 | None | None. |
| Dried aluminum hydroxide gel | do | Strong | Slow | 3.70 | Long | Observed | Low | Prohibiting or controlling | 2.6–3.6 | do | Do. |
| Dawsonite-like substance Al(OH)$_3$.NaHOC$_3$ | do | Slightly strong | Quick | 3.82 | Slightly long | do | High | do | 3.9–4.2 | do | Do. |

*In synthetic aluminum silicate the pH did not reach 3.

these data, it is seen that the synthetic hydrotalcite of the invention satisfies various conditions required of an antacid and exhibits substantially ideal pharmacological actions and effects as an antacid.

4. Data of clinical experiments using the synthetic hydrotalcite of the invention i. Administration methods, amounts administered and administration period varied depending on the institutes where the experiments were conducted and on the decease cases. Therefore, the above conditions could not be unified according to ages of patients. But the following data can be now presented.

| | Number of cases | Amounts administered | Administration period |
|---|---|---|---|
| Less than 20 years old | 8 cases | 1–5 g. | 4–35 days |
| 20–40 Number old | 32 cases | 1–5 g. | 4–56 days |
| 40–60 years old | 22 cases | 1–4 g. | 7–150 days |
| More than 60 years old | 8 cases | 1–4 g. | 10–170 days | ii. Effects:
a. Date of effects of the synthetic hydrotalcite of the invention obtained in each institute are tarbulated respectively.

YOSHITOSHI INTERNAL TREATMENT DEPARTMENT, MEDICINE FACULTY, TOKYO UNIVERSITY

| Disease | Effectiveness | | | | | | | |
|---|---|---|---|---|---|---|---|---|
| | Number of cases | | | | Total of cases | Effectiveness ratio (percent) | Number of effective cases/ number of total cases | Administration stoppage |
| | Extremely effective | Effective | Slightly effective | Not effective | | | | |
| Peptic ulcer | 1 | 4 | 3 | 1 | 10 | 89 | 8/9 | 1 |
| Duodenal ulcer | 1 | 3 | 0 | 2 | 7 | 67 | 4/6 | 1 |
| Gastritis | 0 | 3 | 0 | 0 | 3 | 100 | 3/3 | 0 |
| Total | 2 | 10 | 3 | 3 | 20 | 83 | 15/18 | 2 |

Sannobe Internal Treatment Department, Medicine Faculty, Keio University

| Disease | Effectiveness | | | | | | |
|---|---|---|---|---|---|---|---|
| | Number of cases | | | | Total of cases | Effectiveness ratio (percent) | Number of effective cases/number of total cases |
| | Extremely effective | Effective | Slightly effective | Not effective | | | |
| Peptic ulcer | 4 | 9 | 0 | 7 | 20 | 65 | 13/20 |
| Duodenal ulcer | 3 | 7 | 3 | 2 | 15 | 87 | 13/15 |
| Gastritis | 8 | 11 | 7 | 6 | 32 | 81 | 26/32 |
| Duodenitis | 1 | 5 | 0 | 0 | 6 | 100 | 6/6 |
| Total | 16 | 32 | 10 | 15 | 73 | 80 | 58/73 |

Ariga Internal Treatment Department, Medicine Faculty, Nihon Daigaku

| Disease | Effectiveness | | | | | | |
|---|---|---|---|---|---|---|---|
| | Number of cases | | | | Total of cases | Effectiveness ratio (percent) | Number of effective cases/number of total cases |
| | Extremely effective | Effective | Slightly effective | Not effective | | | |
| Peptic ulcer | 2 | 14 | 5 | 0 | 21 | 100 | 21/21 |
| Duodenal ulcer | 1 | 9 | 7 | 2 | 19 | 90 | 17/19 |
| Chronic gastritis | 0 | 5 | 4 | 1 | 10 | 90 | 9/10 |
| Total | 3 | 28 | 16 | 3 | 50 | 94 | 47/50 |

Second Internal Treatment Department, Aodo Hospital, Jikei Medical College

| Disease | Effectiveness | | | | | | |
|---|---|---|---|---|---|---|---|
| | Number of cases | | | | Total of cases | Effectiveness ratio (percent) | Number of effective cases/number of total cases |
| | Extremely effective | Effective | Slightly effective | Not effective | | | |
| Peptic and duodenal ulcers | 0 | 6 | 1 | 3 | 10 | 70 | 7/10 |
| Gastritis | 0 | 5 | 3 | 7 | 15 | 53 | 8/15 |
| Entero-gastritis | 0 | 2 | 0 | 2 | 4 | 50 | 2/4 |
| Gastrocancer | 0 | 0 | 1 | 0 | 1 | 100 | 1/1 |
| Total | 0 | 13 | 5 | 12 | 30 | 60 | 18/30 |

Second Internal Treatment Department, Nihon Medical College

| Disease | Effectiveness | | | | | | |
|---|---|---|---|---|---|---|---|
| | Number of cases | | | | Total of cases | Effectiveness ratio (percent) | Number of effective cases/number of total cases |
| | Extremely effective | Effective | Slightly effective | Not effective | | | |
| Peptic and duodenal ulcers | 0 | 11 | 0 | 0 | 11 | 100 | 11/11 |
| Chronic gastritis | 0 | 19 | 3 | 7 | 29 | 76 | 22/29 |
| Total | 0 | 30 | 3 | 7 | 40 | 83 | 33/40 |

(b) The above data of the effectiveness obtained in each institute are summarized in table below.

| Disease | Effectiveness | | | | | | |
|---|---|---|---|---|---|---|---|
| | Effective ratio, percent; Number of effective cases/number of total cases | | | | | Summarized effectiveness ratio (percent) | Number of effective cases/number of total cases |
| | Tokyo University | Keio University | Nihon University | Jikei Medical College | Nihon Medical College | | |
| Peptic and duodenal ulcers | 80:12/15 | 74:26/35 | 95:38/40 | 70: 7/10 | 100:11/11 | 85 | 95/111 |
| Gastritis | | 100: 3/3 | 81:26/32 | 90: 9/10 | 53: 8/15 | 76:22/29 | 76 | 68/89 |
| Duodenitis | | | 100: 6/6 | | | | 100 | 6/6 |
| Enterogastritis | | | | 50: 2/4 | | 50 | 2/4 |
| Gastrocancer | | | | 100: 1/1 | | 100 | 1/1 |
| Total | 83: 15/18 | 80: 58/73 | 94: 47/50 | 60: 18/30 | 83: 33/40 | 8/ | 17/211 | iii. Side effects observed at the above-mentioned clinical experiments are tabulated as follows:

| Institute | Number of total cases | Class of side effect | Number of cases where side effects were observed |
|---|---|---|---|
| Tokyo University | 18 | Diarrhea | 1 |
| Keio University | 73 | Chest trouble | 1 |
| | | Indisposition | 1 |
| | | Nausea | 1 |
| Nihon University | 50 | Diarrhea | 1 |
| Jikei Medial College | 30 | | 0 |
| Nihon Medical College | 40 | Diarrhea | 1 |
| Total | 211 | | 6 (2.8%) |

From the data given hereinabove, it is apparent that the hydrotalcite of this invention can provide an antacid which is excellent in its prompt but lasting neutralizing action, and is never impaired by a long time storage and that it can exhibit said excellent neutralizing action as well as its acid consuming capacity even after it has been boiled, while the conventional antacid such as magnesium carbonate aluminum hydroxide co-dried gel, loses almost its capacity after 1 hour's boiling. Of course the antacid of the invention may suitably contain, besides the hydrotalcite, aluminum hydroxide, magnesium carbonate, calcium carbonate, magnesium hydroxide, aluminum hydroxide-alkali carbonate complex, silicate and the like. Such antacid comprising the synthetic hydrotalcite of the invention and the foregoing substances can be prepared by mixing the latter with the hydrotalcite or coprecipitating the hydrotalcite with the substance or substances by reacting the starting materials for the hydrotalcite in the presence of a suitable amount of the foregoing substances or of the starting materials for such substances.

Furthermore, the hydrotalcite of the invention when made into tablet, exhibits excellent hardness and compression strength. Therefore, it is highly useful as an excipient for tablet in the pharmaceutical field and in other chemical industried.

The relation between the hardness and compression pressure in the hydrotalcite of this invention and known excipients is shown in Table 9 below.

TABLE 9.—COMPRESSION PRESSURE-HARDNESS

| Compression pressure (kg./cm.²) | Hardness (kg./cm.²) | | | | | |
|---|---|---|---|---|---|---|
| | Synthetic hydrotalcite of the invention | Product by the method of D. Roy et al. | Natural hydrotalcite produced in Snarum, Norway | Aluminum hydroxide dried gel | Crystalline lactose | Microcrystalline cellulose |
| 318 | 14.2 | 2.0 | 1.1 | 2.4 | 0 | 12.3 |
| 636 | >25 | 3.8 | 2.2 | 6.0 | 0 | 19.8 |
| 955 | >25 | 5.7 | 3.4 | 11.2 | 0.9 | >25 |
| 1,274 | >25 | 7.4 | 4.5 | 16.8 | 1.8 | >25 |
| 1,911 | >25 | 10.8 | 6.8 | >25 | 2.8 | >25 |
| 2,548 | >25 | 14.0 | 9.5 | >25 | 5.8 | >25 |

It is clear from the above table that the hydrotalcite of the invention can give tablets sufficient hardness at a lower pressure than the known excipients.

The invention will now be described with reference to the examples.

EXAMPLE 1

6.86 Liters of an aqueous suspension containing aluminum hydroxide in an amount corrensponding to 102 g. of alumina, 350 g. of magnesium hydroxide and 420 g. of sodium bicarbonate was heated to 85° C. with agitation, and maintained at the said temperature for 3 hours. Thereafter, the system was filtered to separate the mother liquor, and the solid was washed with 21 liters of water and dried at 70° C. to provide 650 g. of the product. The reaction formula, and the analysis value ($MgO:Al_2O_3:CO_2$ in terms of mol ratio) and the acid consuming capacity of the product were as follows:

$$2Al(OH)_3 + 6Mg(OH)_2 NaHCO_3 + 3H_2O$$
$$\rightarrow Mg_6Al_2(OH)_{16}CO_3 \cdot 4H_2O + NaOH$$

| | Molar Ratio | |
|---|---|---|
| | Measured value | Calculated value |
| MgO | 6.05 | 6.00 |
| Al₂O₃ | 1.00 | 1.00 |
| CO₂ | 1.42* | 1.00 |
| Acid consuming capacity | 279 ml. | |

(Note) The acid consuming capacity is expressed by number of ml. of 0.1 N Hydrochloric acid required to neutralize 1 g. of the product. When the product was washed with water sufficiently, the molar ratio of $CO_2$ was reduced to 1.08.

EXAMPLE 2

To an aqueous suspension of aluminum hydroxide-sodium carbonate complex containing 51 g. of aluminum component as alumina (0.5 mol) and 75.5 g. of carbonate ion source as sodium bicarbonate (0.9 mol), 122 g. (3 mols) of magnesium oxide was added to make the total of 3.5 liters of the suspension. The same was heated to 85° C. with agitation for 2 hours and filtered. The solid was washed with water and dried to provide 330 g. of the product. The reaction formula and the analysis value and acid consuming capacity of the product were as follows:

$$Al(OH)_3 \cdot NaHCO_3 + 6MgO + 8H_2O$$
$$\rightarrow Mg_6Al_2(OH)_{16}CO_3 \cdot 4H_2O + Na_2CO_3$$

| | Molar Ratio |
|---|---|
| MdO | 6.00 |
| Al₂O₃ | 1.00 |
| CO₂ | 1.16* |
| Acid consuming capacity | 269 ml. |

(Note) When the product was washed with water sufficiently, the molar ratio of $CO_2$ was reduced to 1.02.

EXAMPLE 3

Aluminum sulfate in an amount corresponding to 17 g. of alumina was used to make 1 liter of an aqueous solution, and 106 g. of sodium carbonate was also made into 1 liter of an aqueous solution, which were then poured into a suspension formed of 60 g. of magnesium hydroxide suspended in 0.4 liter of water at a constant flow rate with agitation. Thereafter, the suspension was washed with water until the presence of sulfate radical became no more observable, and again suspended in water. After 3 hours of heating at 85° C., the system was dehydrated and dried to provide 110 g. of the product. The reaction formula, and the analysis value and acid consuming capacity of the product were as follows:

$$6Mg(OH)_2 + Al_2(SO_4)3 + 3Na_2CO_3 + 8H_2O$$
$$\rightarrow Mg_6Al_2(OH)_{16}CO_3 \cdot 4H_2O + 3Na_2SO_4 + 2H_2CO_3$$

| | Molar Ratio |
|---|---|
| MgO | 6.00 |
| Al₂O₃ | 1.00 |
| CO₂ | 1.17 |
| Acid consuming capacity | 272 ml. |

(Note) When the product was washed with water sufficiently, the molar ratio was reduced to 1.04.

EXAMPLE 4

To aluminum hydroxide in the amount corresponding to 25.5 g. of alumina, an aqueous solution containing 120 g. of caustic soda was added to make a total of 1 liter of a solution with agitation. The same was mixed under agitation with 3 liters of magnesium chloride solution of which solid content corresponding to 60.5 g. of magnesia and whereby reacted at 30° C. while carbon dioxide gas was introduced into the system without any pressurization. After the reaction the precipitate was filtered, washed with water and dried to provide 160 g. of the product. The analysis value and the acid consuming capacity of the product were as follows:

| | Molar Ratio |
|---|---|
| MgO | 5.85 |
| Al₂O₃ | 1.00 |
| CO₂ | 1.04 |
| Acid consuming capacity | 280 ml. |

EXAMPLE 5

Aluminum sulphate and magnesium chloride were dissolved into water to make a solution containing 10.2 g. of $al_2O_3$ and 24.2 g. of MgO per liter. Separately, a solution containing 40 g. of caustic soda and 35 g. of sodium carbonate per liter was prepared. The former solution and the latter solution were continuously poured, while stirring, into a reaction vessel which was adapted to overflow with the amount of liquid maintained at 1.2 liters, in an amount of 16.7 ml./min. and 25 ml./min. respectively. The pH of the reacted suspension was 10.4. After 3 hours' pouring at room temperature, the reacted suspension was collected, washed with 6 liters of water, and dried at a temperature not higher than 150° C. to give 210 g. of a final product.

The analytical values and acid consuming capacity are as follows:

|  | Molar Ratio |
| --- | --- |
| MgO | 5.98 |
| $Al_2O_3$ | 1.00 |
| $CO_2$ | 1.43 |
| Acid consuming capacity | 258 ml. |

(Note) When the product was washed with water sufficiently, the molar ratio of $CO_2$ was reduced to 1.10.

EXAMPLE 6

Basic aluminum carbonate containing 34 g. of $Al_2O_3$ and basic magnesium carbonate containing 13.4 g. of MgO, and magnesium hydroxide containing 67.2 g. of MgO were suspended into water to make 2 liters of a suspension. The suspension was heated to 85° C. Immediately, the reacted suspension was dehydrated and dried to give 213 g. of a final product.

The analytical values and acid consuming capacity are as follows:

|  | Molar Ratio |
| --- | --- |
| MgO | 5.85 |
| $Al_2O_3$ | 1.00 |
| $CO_2$ | 1.05 |
| Acid consuming capacity | 275 ml. |

EXAMPLE 7

One hundred grams of dihydroxyaluminum aminoacetate containing 35.0 percent of $al_2O_3$, magnesium hydroxide containing 83 g. of MfO and 100 g. of sodium bicarbonate were suspended into water to make 1.5 liters of suspension. It was put into an autoclave and heated while stirring. After having been maintained at a temperature of 120° C. for 20 minutes, the suspension was washed with water, dehydrated, and dried to give 212 g. of a final product.

The analytical values and acid consuming capacity are as follows:

|  | Molar Ratio |
| --- | --- |
| MgO | 5.90 |
| $Al_2O_3$ | 1.00 |
| $CO_2$ | 1.33 |
| Na | 0.01 % |
| Acid consuming capacity | 286 ml. |

(Note) When the product was washed sufficiently with water, the molar ratio of $CO_2$ was reduced to 1.06.

What we claim is:

1. A synthetic hydrotalcite having the composition expressed by the formula:

$$Al_2O_3 \cdot 6MgO \cdot CO_2 \cdot 12H_2O$$

and having substantially the following X-ray diffraction analysis:

| d.Å. |
| --- |
| 7.75 |
| 3.89 |
| 2.59 |
| 2.30 |
| 2.96 |
| 1.53 |
| 1.50 | said synthetic hydrotalcite containing heavy metal impurities in amounts of up to 30 p.p.m., being substantially insoluble when treated with 1/10 N NaOH at 37° C. for 1 hour, having an acid consuming capacity, expressed in terms of the amount (ml.) of 0.1 N hydrochloric acid required for neutralizing 1 gram of said hydrotalcite, of at least 240 ml./g., and being characterized by such properties that when 1 gram of said synthetic hydrotalcite is added to 150 ml. of artificial gastric juice, followed by agitation for 10 minutes and the artificial gastric juice is continuously added thereto at a rate of 2 ml./min., the time required for the artificial gastric juice to come to have a pH of higher than 3.0 is up to 30 seconds and the time during which the pH of the artificial gastric juice is maintained above 3.0 is more than 120 minutes, the maximum pH of the artificial gastric juice during said time being maintained below 4.5.

2. An excipient consisting essentially of the synthetic hydrotalcite of claim 1, having a hardness of over 25 kg./cm.² when said excipient is compressed at a compression pressure of 636 kg./cm².

* * * * *

UNITED STATES PATENT OFFICE
CERTIFICATE OF CORRECTION

Patent No. 3,650,704　　　　　Dated March 21, 1972

Inventor(s) KUMURA ET AL

It is certified that error appears in the above-identified patent and that said Letters Patent are hereby corrected as shown below:

Column 14, Table between lines 50 and 63, the 3rd entry, delete "Number" and insert -- years --.

In the table under sub-paragraph (b) in column 15, the 1st entry under the heading "Number of effective cases/number of total cases", delete "95/111" and insert -- 94/111 --.

Signed and sealed this 29th day of August 1972.

(SEAL)
Attest:

EDWARD M. FLETCHER, JR.
Attesting Officer

ROBERT GOTTSCHALK
Commissioner of Patents